United States Patent
Schievelbusch

(10) Patent No.: US 7,708,226 B2
(45) Date of Patent: May 4, 2010

(54) DEVICE FOR DETECTING SYNCHRONOUS ERRORS OF HIGH-LIFT SURFACES ON AIRCRAFT

(75) Inventor: Bernd Schievelbusch, Lindenberg (DE)

(73) Assignee: Liebherr-Aerospace Lindenberg GmbH, Lindenberg/Allgau (DE)

( * ) Notice: Subject to any disclaimer, the term of this patent is extended or adjusted under 35 U.S.C. 154(b) by 1215 days.

(21) Appl. No.: 11/229,164

(22) Filed: Sep. 16, 2005

(65) Prior Publication Data

US 2007/0051183 A1    Mar. 8, 2007

(30) Foreign Application Priority Data

Sep. 16, 2004   (DE) ................ 10 2004 044961

(51) Int. Cl.
   *B64C 9/00*   (2006.01)
   *G01M 5/00*   (2006.01)

(52) U.S. Cl. ............... 244/129.1; 244/194; 73/802

(58) Field of Classification Search ............... 244/35 R, 244/129.1, 194; 73/800, 802
   See application file for complete search history.

(56) References Cited

U.S. PATENT DOCUMENTS

| 3,095,783 | A | * | 7/1963 | Flindt ................... 91/1 |
| 4,422,180 | A | * | 12/1983 | Wendt ................... 398/110 |
| 5,222,165 | A | | 6/1993 | Bohlinger |
| 5,638,165 | A | * | 6/1997 | Duke et al. ............ 356/32 |
| 5,639,968 | A | | 6/1997 | Bobb et al. |
| 5,896,191 | A | * | 4/1999 | Beier et al. ........... 356/35.5 |
| 6,666,400 | B2 | * | 12/2003 | White, III ............. 244/1 R |

FOREIGN PATENT DOCUMENTS

| EP | 726201 | 5/2000 |
| EP | 1029784 | 8/2000 |
| EP | 10 88753 | 4/2001 |

* cited by examiner

*Primary Examiner*—Rob Swiatek
(74) *Attorney, Agent, or Firm*—Dilworth & Barrese LLP

(57) ABSTRACT

A device for detecting synchronous errors of high-lift surfaces such as landing flaps or slats on aircraft, having an optical conductor which is laid over at least two adjacent high-lift surfaces, a light source and an optical receiver which are allocated to different ends of the optical conductor, as well as an evaluation unit for determining a synchronous error of the high-lift surfaces on the basis of the light signal received from the optical receiver. The optical conductor is laid in such a way that the optical conductor experiences a break-free deformation due to synchronous errors and consequently causes a change of the transmitted light signals, and the evaluation unit compares the signal shape of the light signal received from the optical receiver or an optical receiver output signal derived therefrom with a nominal signal shape and determines the presence of a synchronous error on the basis of the deviation in shape between the received light signal or the optical receiver output signal derived therefrom and the nominal signal.

20 Claims, 1 Drawing Sheet

DEVICE FOR DETECTING SYNCHRONOUS ERRORS OF HIGH-LIFT SURFACES ON AIRCRAFT

BACKGROUND OF THE INVENTION

The present invention relates to a device for detecting synchronous errors of high-lift surfaces such as landing flaps or slats on aircraft, comprising an optical conductor which is laid over at least two adjacent high-lift surfaces, a light source and an optical receiver which are allocated to different ends of the optical conductor, as well as an evaluation unit for determining a synchronous error on the basis of the light signal received from the optical receiver.

Usually, in aircraft wings, there are several high-lift surfaces or flaps in the form of slats and/or landing flaps arranged adjacent to one another. These are normally operated synchronously with appropriate flying manoeuvres. If this results in ruptures in the suspension or breakdown or jamming of the control elements of these high-lift surfaces, one or even more of the adjacent high-lift surfaces can no longer be extended to the desired degree. On the one hand, this results in unwanted rolling moments of the aircraft due to asymmetry, on the other hand, in high mechanical stresses of the flap bodies and the remaining intact drive line as well as of the structure of the wing case.

Various detection systems have already been proposed to identify such synchronous errors of the movable high-lift surfaces. According to a first solution, proximity switches or angle sensors detect the extended position of the high-lift flaps on the basis of the kinematics thereof. The synchronism is electronically monitored on the basis of the signals of these sensors. However, sensor systems of this type are constructed in a comparatively complex manner.

Another known detection system for synchronous errors of this type is the so-called lanyard system in which a rope is placed over the span of the wing to be monitored, said rope being fastened to the outer end of the flap body on the outside of the wing and connected with a switch to the flap body on the inside of the wing. When synchronous errors occur, the rope is pulled tight due to the changed length of the built-in area, as a result of which said switch is actuated. Due to the large span of the rope, however, this system does not exhibit a very sensitive response behaviour.

Furthermore, it has already been proposed to detect the aforementioned synchronous errors by a so-called overload detector. The increased friction or blockage caused by the skew in the flap guide releases the corresponding overload safety device of the flap drive system. However, with this system, the drive and the corresponding structural components experience comparatively high mechanical stresses since the system does not respond until the overload is reached.

A device of the aforementioned type is known from EP 1 029 784 B1. An optical fiber cable is led over all of the guiding edges/high-lift surfaces of an aircraft wing and provided for transmitting a light signal generated by a light signal generator on one end of the cable to a light signal detector on the other end of the cable. The optical cable is thereby led at each transition point between two adjacent high-lift surfaces through two control elements which are directly adjacent to one another and belong to various high-lift surfaces. The cable is thereby led through elongated slits in the control elements, so that slight misalignments do not have any effect on the cable. However, if the relative movement between two adjacent high-lift surfaces exceeds the permissible degree of tolerance defined by the elongated slits, the cable is cut by the two control elements sliding past one another, so that the signal transmission is interrupted by the optical conductor cable. The breakdown of the signal at the optical receiver is detected as a synchronous error by the evaluation unit connected therewith. Of course, the disadvantage of this previously known system is the fact that it is already destroyed when synchronous errors occur for the first time and the optical cable must be replaced accordingly. To avoid this, according to a second embodiment described in EP 1 029 784 B1, the cable should have a nominal rupture point in the form of a plug/socket connection between each of the two control elements of the respectively adjacent high-lift surfaces. After the synchronous error which has occurred has been eliminated, the corresponding segments of the optical conductor cable can be reconnected via the plug/socket arrangement. However, this arrangement of plug/socket connections between each pair of control elements on adjacent high-lift surfaces is relatively extensive, in particular in its assembly.

SUMMARY OF THE INVENTION

Thus, the object of the present invention is to create an improved device of the aforementioned type to detect synchronous errors of high-lift surfaces on aircraft which avoids the disadvantages of the prior art and further develops the latter in an advantageous manner. In particular, a simply constructed system with high response sensitivity should be created which enables repeated operations without extensive intermediate maintenance.

According to the invention, this object is solved by a device according to the description herein. Preferred embodiments are also the subject of the invention herein.

Thus, according to the invention, the optical conductor is laid in such a way that it experiences a break-free deformation due to synchronous errors which causes a change of the respectively transmitted light signal. The evaluation unit is designed in such a way that it compares the signal shape of the light signal received from the optical receiver or of the optical receiver output signal generated therefrom with the shape of a nominal signal and determines the presence of a synchronous error on the basis of the deviation between the shape of the optical receiver signal and the nominal signal. In particular, the device is designed free of signal interruptions which would split the optical conductor when there are synchronous errors. There is no mere in/out detection, but a qualitative detection of the signal shape arriving at the optical receiver. The invention is based on the finding that a break-free deformation of the optical conductor changes its reflex index, so that a change of the transmitted light signal occurs corresponding to the deformation of the conductor. Accordingly, by detecting the deviation of the received signal from a nominal signal, conclusions can be made about the deformation of the optical conductor and, as a result, about the presence of a synchronous error. Therefore, it is only necessary to install the optical conductor at the transitional points between adjacent high-lift surfaces in such a way that a relative moment between the adjacent high-lift surfaces produces a changed laying pattern of the optical conductor, so that it experiences a deflection and/or, perhaps, a compression or expansion which leads to a change of the light transmission characteristic of the conductor, in particular of its reflex index.

In a further embodiment of the invention, a pulse generator is provided as light source, said pulse generator producing a pulse-shaped sequence of light signals in a predeterminable signal shape. The generated light pulses can be sinusoidal in shape, but also rectangular or triangular.

Deviations of the received light signal or of the corresponding optical receiver output signal from the corresponding nominal signal can be determined on the basis of various signal characteristics. To this end, the evaluation unit can record the pulse length, the pulse distance between successive light pulses, the pulse amplitude, the pulse slope and/or the pulse pattern and compare them with the respective nominal values. A deviation showing a synchronous error can be indicated when one of the variables, or even not until several of the variables characterizing the received signal, deviates from the corresponding nominal variables.

The nominal signal and/or the values characterizing it can be stored in a storage unit connected with the evaluation unit, so that the evaluation unit ascertains the change of the transmitted light signal due to a changed laying pattern of the optical conductor by a comparison with the stored nominal signal or the stored values. Alternatively, the evaluation unit can also directly compare the light signal arriving at the optical receiver with the light signal produced at the light source and determine whether any deviations that might be detected are untypical, i.e. do not correspond to those deviations which are produced in an undeformed optical conductor. The advantage of the latter is that the evaluation during ensuing changes at the light source are automatically adapted. The aforementioned design, which conducts an adjustment with stored signal values, is characterized by simplified signal processing.

In a further development of the invention, the optical conductor is laid in a semispan manner over all adjacent high-lift surfaces which belong to a group of high-lift surfaces. As a result, by laying a single optical conductor, all high-lift surfaces of the respective group, e.g. the landing flaps of an aircraft wing, are monitored.

BRIEF DESCRIPTION OF THE DRAWINGS

The invention will be described in greater detail in the following with reference to a preferred embodiment and associated drawings, showing.

DESCRIPTION OF THE PREFERRED EMBODIMENTS

Figure 1:
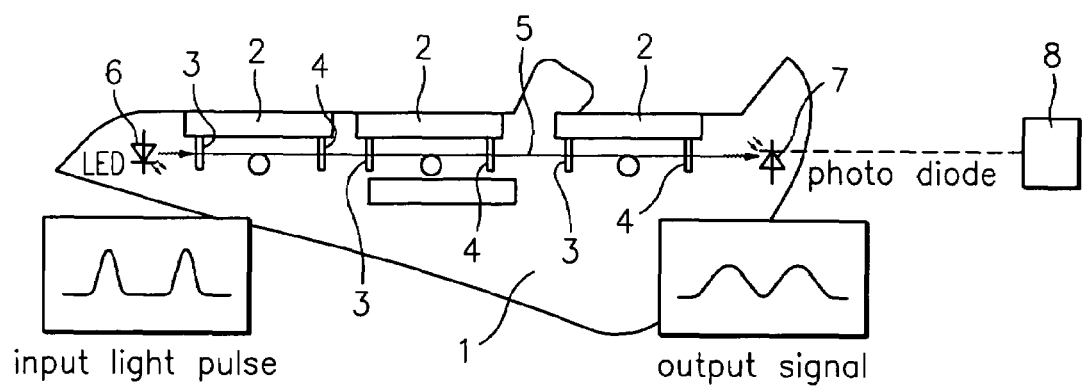
FIG. 1: a schematic top view onto an aircraft wing with three movable high-lift surfaces on the wing guide edge and the device associated therewith for monitoring synchronous errors of the high-lift surfaces, wherein the high-lift surfaces are shown in a synchronous state of motion without synchronous errors and the corresponding optical signals at the light source and the optical receiver.
Figure 2:
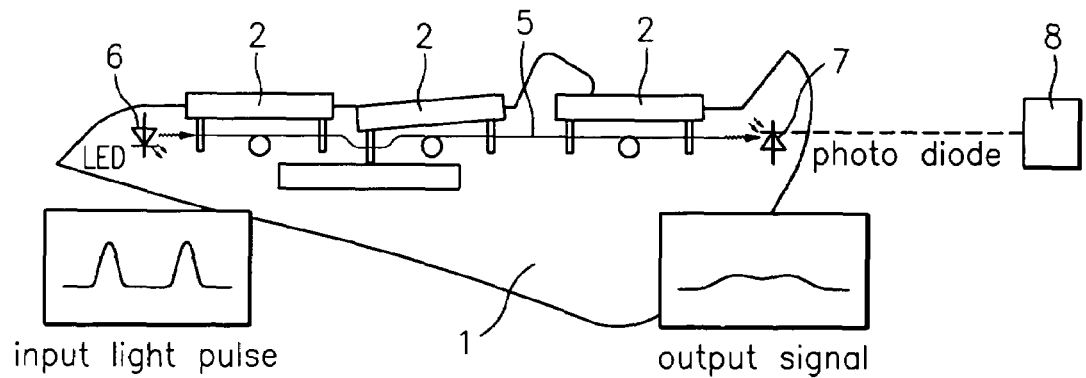
FIG. 2: a schematic top view onto the wing of FIG. 1, whereby the high-lift surfaces are shown in an extended position with a synchronous error at the central high-lift surface and the signal changes resulting therefrom at the optical receiver.

As FIGS. 1 and 2 show, several high-lift surfaces 2 which can be moved by two control elements 3 and 4 each between a retracted and an extended position are provided on the guide edge of the aircraft wing 1. In normal operation, the control elements 3 and 4 of all high-lift surfaces 2 are moved synchronously to one another, so that there is no relative movement between adjacent high-lift surfaces 2 and the associated control elements 3 and 4.

As FIG. 1 shows, an optical conductor 5 is placed over all high-lift surfaces 2. In the embodiment shown, the optical conductor 5 is thereby fastened to the control elements 3 and 4. On a first end of the optical conductor 5, a light source 6 is provided which is a light diode in the embodiment shown and forms a light pulse generator.

The optical conductor 5 transmits the light signals produced by the light source 6 to an optical receiver 7 which is situated on the other end of the optical conductor 5 and which is a photodiode in the embodiment shown. The optical receiver 7 forms a receiver sensor which converts the received light pulses into an electric signal shape which is evaluated by an evaluation unit 8 connected with the optical receiver 7.

If, as provided, the high-lift surfaces 2 operate synchronously with one another, the laying pattern of the optical conductor 5 is only slightly affected by elastic deformations of the wing 1 when in operation. However, if the synchronism of the system is disturbed on one of the high-lift surfaces 2, e.g. by a mechanical blockage in the flap guide or by a so-called disconnect, then the laying pattern of the optical conductor 5 is changed at the transition between two adjacent high-lift surfaces 2, as shown in FIG. 2. The optical conductor 5 is thereby fastened to the control elements 3 and 4 of the high-lift surfaces 2 in such a way that a synchronous error and with it a relative movement between two adjacent control elements 3 and 4 of two adjacent high-lift surfaces 2 leads to a deformation of the optical conductor 5 which results in a change of the reflex index of the conductor, so that the light pulses which are transmitted by the optical conductor 5 from the light source 6 to the optical receiver 7 are changed in their signal shape. As FIG. 2 shows, especially the light pulse can be jammed in this case, i.e. the pulse amplitude can be reduced, the pulse length increased, the pulse distance reduced, the pulse slope reduced and, on the whole, the pulse pattern can be changed in such a way that the sole provided per se between two light pulses is no longer reached (see FIG. 2).

The evaluation unit 8 compares the signal shape which arrived at the optical receiver or the electric signal emitted accordingly by the optical receiver with the nominal signal, just as would be present in an undeformed optical conductor 5 on the optical receiver and shown in FIG. 1. The change is identified as an error by the evaluation unit 8, whereupon the switching off of the drive system for the movement of the high-lift surfaces 2 is initiated and a warning message is issued to the pilot.

The described device for detecting synchronous errors of the high-lift surfaces 2 has no moving parts and, in this respect, is wear-free and maintenance-free. As a result of the fact that the optical conductor 5 is not severed as in the prior art when a synchronous error occurs, but is only deformed without breaking, a repeated operation of the detection system is possible without extensive interposed maintenance steps.

In comparison with the prior art with the so-called lanyard system, an increased response sensitivity is obtained. In addition, in comparison to the previously known solutions with angle sensors and proximation switches, it is clearly less complex and thus more reliable and less expensive.

In comparison to systems which are not switched off until the overload has been reached, a lower component stress is obtained, as a result of which the drive and structural components can be designed for lower stresses, which results in a lower aircraft weight.

In addition, the device is distinguished by a very high degree of resistance to environmental influences.

The invention claimed is:

1. A device for detecting synchronous errors of high-lift surfaces (2), comprising an optical conductor (5) which is laid over at least two adjacent high-lift surfaces (2), a light source (6) and an optical receiver (7) which are allocated to different ends of the optical conductor (5), as well as an evaluation unit (8) for determining a synchronous error of the high-lift surfaces (2) on the basis of the light signal received from the optical receiver (7), wherein the optical conductor (5) is placed in such a way that the optical conductor (5) experiences a break-free deformation due to synchronous errors and consequently causes a change of the transmitted light signals, and that the evaluation unit (8) compares the signal shape of the light signal received from the optical receiver (7) or an optical receiver output signal derived therefrom with a nominal signal shape and determines the presence of a synchronous error on the basis of the deviation in shape between the received light signal or the optical receiver output signal derived therefrom and the nominal signal.

2. The device according to claim 1, wherein it is designed free of signal interruptions for cutting the conductor.

3. The device according to claim 2, wherein the light source (6) is designed as a pulse generator which generates a pulse-shaped sequence of light signals in a predeterminable signal shape.

4. The device according to claim 3, wherein the light evaluation unit (8) determines the signal shape deviation on the basis of at least one of deviations in the pulse length, the pulse distance, the pulse amplitude, the pulse slope and the pulse pattern.

5. The device according to claim 4, wherein the evaluation unit (8) for determining the signal shape deviation refers to a nominal signal stored in a storage unit, said nominal signal corresponding to at least one of the light signal received at the optical receiver and the optical receiver output signal derived therefrom with undeformed optical conductors (5).

6. The device according to claim 3, wherein the evaluation unit (8) for determining the signal shape deviation refers to a nominal signal stored in a storage unit, said nominal signal corresponding to at least one of the light signal received at the optical receiver and the optical receiver output signal derived therefrom with undeformed optical conductors (5).

7. The device according to claim 2, wherein the evaluation unit (8) determines the signal shape deviation on the basis of at least one of deviations in the pulse length, the pulse distance, the pulse amplitude, the pulse slope and the pulse pattern.

8. The device according to claim 7, wherein the evaluation unit (8) for determining the signal shape deviation refers to a nominal signal stored in a storage unit, said nominal signal corresponding to at least one of the light signal received at the optical receiver the optical receiver output signal derived therefrom with undeformed optical conductors (5).

9. The device according to claim 8, wherein the optical conductor (5) is placed in a semispan manner over all adjacent high-lift surfaces (2) which belong to a group of high-lift surfaces (2).

10. The device according to claim 2, wherein the evaluation unit (8) for determining the signal shape deviation refers to a nominal signal stored in a storage unit, said nominal signal corresponding to at least one of the light signal received at the optical receiver and the optical receiver output signal derived therefrom with undeformed optical conductors (5).

11. The device according to claim 2, wherein the optical conductor (5) is placed in a semispan manner over all adjacent high-lift surfaces (2) which belong to a group of high-lift surfaces (2).

12. The device according to claim 1, wherein the light source (6) is designed as a pulse generator which generates a pulse-shaped sequence of light signals in a predeterminable signal shape.

13. The device according to claim 12, wherein the evaluation unit (8) determines the signal shape deviation on the basis of at least one of deviations in the pulse length, the pulse distance, the pulse amplitude, the pulse slope and the pulse pattern.

14. The device according to claim 13, wherein the evaluation unit (8) for determining the signal shape deviation refers to a nominal signal stored in a storage unit, said nominal signal corresponding to at least one of the light signal received at the optical receiver and the optical receiver output signal derived therefrom with undeformed optical conductors (5).

15. The device according to claim 12, wherein the evaluation unit (8) for determining the signal shape deviation refers to a nominal signal stored in a storage unit, said nominal signal corresponding to at least one the light signal received at the optical receiver and the optical receiver output signal derived therefrom with undeformed optical conductors (5).

16. The device according to claim 12 wherein the optical conductor (5) is placed in a semispan manner over all adjacent high-lift surfaces (2) which belong to a group of high-lift surfaces (2).

17. The device according to claim 1, wherein the evaluation unit (8) determines at least one of the signal shape deviation on the basis of deviations in the pulse length, the pulse distance, the pulse amplitude, the pulse slope and the pulse pattern.

18. The device according to claim 17, wherein the evaluation unit (8) for determining the signal shape deviation refers to a nominal signal stored in a storage unit, said nominal signal corresponding to at least one of the light signal received at the optical receiver and the optical receiver output signal derived therefrom with undeformed optical conductors (5).

19. The device according to claim 1, wherein the evaluation unit (8) for determining the signal shape deviation refers to a nominal signal stored in a storage unit, said nominal signal corresponding to at least one of the light signal received at the optical receiver and the optical receiver output signal derived therefrom with undeformed optical conductors (5).

20. The device according to claim 1, wherein the optical conductor (5) is placed in a semispan manner over all adjacent high-lift surfaces (2) which belong to a group of high-lift surfaces (2).

* * * * *